United States Patent [19]

Hay et al.

[11] Patent Number: 5,614,607

[45] Date of Patent: Mar. 25, 1997

[54] POLYIMIDE AND A METHOD OF PREPARING POLYAMIDE FROM TETRACARBOXYLIC DIANHYDRIDE AND DIISOCYANATE

[75] Inventors: John N. Hay, Guildfoud; Barry Woodfine, Ederbridge, both of United Kingdom

[73] Assignee: Kabushiki Kaisha Kobe Seiko Sho, Kobe, Japan

[21] Appl. No.: 413,271

[22] Filed: Mar. 30, 1995

[51] Int. Cl.$^6$ .................................................. C08G 73/10
[52] U.S. Cl. .......................... 528/353; 528/69; 528/125; 528/128; 528/172; 528/173; 528/179; 528/185; 528/188; 528/220; 528/229; 528/350
[58] Field of Search ..................... 528/353, 350, 528/220, 229, 125, 128, 172, 173, 179, 185, 188, 69

[56] References Cited

U.S. PATENT DOCUMENTS

| | | | |
|---|---|---|---|
| 3,708,458 | 1/1973 | Alberino et al. | 528/353 |
| 3,857,820 | 12/1974 | Kojima et al. | 528/353 |
| 3,915,938 | 10/1975 | Mazaki et al. | 528/353 |
| 3,997,513 | 12/1976 | Noda et al. | 528/353 |
| 4,001,186 | 1/1977 | Onder | 528/353 |
| 4,021,412 | 5/1977 | Onder | 528/353 |
| 4,156,065 | 5/1979 | Onder et al. | 528/353 |
| 5,120,814 | 6/1992 | Seidl et al. | 528/57 |
| 5,270,431 | 12/1993 | Blum | 528/69 |
| 5,384,390 | 1/1995 | Schobesberger et al. | 528/353 |

OTHER PUBLICATIONS

"Polyimides", D. Wilson, et al., 1990, pp. 44, 45, 56, 72, and 73; published Blackie & Son Ltd. England.

Polyimides: Materials, Chemistry, and Characterization, pp. 479–486, 1989, B. Ramalingam, et al., "The Determination of Structure–Property Relationships for Polyimides Derived from Diamines Containing Nonaromatic Linkages".

*Primary Examiner*—James J. Seidleck
*Assistant Examiner*—P. Hampton-Hightower
*Attorney, Agent, or Firm*—Oblon, Spivak, McClelland, Maier & Neustadt, P.C.

[57] ABSTRACT

The invention provides a method of preparing a polyimide by reacting together a dianhydride and a diisocyanate or equivalent, the polyimide having repeating units of the general formula (I):

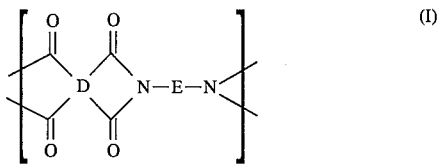

in which D is a group comprising one or more aromatic rings, to which the imide carbon atoms are directly bonded, and E is a group comprising one or more cycloaliphatic or aromatic rings, to which the imide nitrogen atoms are bonded directly or via an aliphatic group, provided that the imide nitrogen atoms are not bonded directly to an aromatic ring. Such polyimide is colourless or of low colour.

4 Claims, No Drawings

POLYIMIDE AND A METHOD OF PREPARING POLYAMIDE FROM TETRACARBOXYLIC DIANHYDRIDE AND DIISOCYANATE

BACKGROUND OF THE INVENTION

1. Field of the Invention

This invention relates to polyimides, more particularly to colourless and low colour polyimides, and a method for their preparation.

2. Description of the Background

Colourless polymers are used in a wide range of applications. Many of these materials lie between commodity and speciality polymers and find use in application areas where cost remains a prime consideration. These types of polymer include acrylics and polycarbonates. They find use in applications as diverse as packaging and headlamp lenses. Their temperature capability is normally limited to no more than 100° to 120° C.

Another polymer category where low colour is required in some applications is high temperature polymers. An increasingly important field of application of colourless high temperature polymers is in optoelectronics. High temperature capability is needed because of the high power rating of modern high density microelectronic circuitry. Other opportunities exist in the coatings field. Few colourless high temperature polymers exist because the chemical features which lead to high thermal stability often result in coloured products. A number of approaches have been adopted to make colourless polymers such as polyimides. In general, these approaches lead to a significant increase in the cost of the polymers.

Much of the prior art concerning colourless high temperature polymers is concerned with the use of fluorine-containing substituents. Early work of Polaroid focused on the incorporation of trifluoromethyl (TFM) groups in the meta positions of biphenyl units in the main chain of polyamides. The bulky TFM groups prevent coplanarity of the adjacent phenyl rings in the biphenyl units, thus hindering the interactions which lead to colour development. The synthesis of the TFM-containing monomer is complex, leading to relatively high cost of the polymer.

Colourless or low colour polyimides have been studied in depth by NASA (see, for example, T. L. St. Clair in "Polyimides", Eds. D. Wilson, H. D. Stanzenberger and P. M. Hergenrother, Blackie, 1990). The main approaches to reducing colour have been to introduce groups which either disrupt extended conjugation along the polymer backbone, or which eliminate the electronic interactions such as charge transfer complexation which lead to colour. A. K. St. Clair and T. L. St. Clair have described in U.S. Pat. No. 4,603,061 the use of diamine and dianhydride monomers containing bulky electron-withdrawing groups and separator groups to reduce the colour in the resultant polyimides. The majority of colourless or low colour systems reported contained the hexafluoroisopropylidene group. The same inventors described in U.S. Pat. No. 4,595,548 the preparation of low colour polyimides containing phenoxy or thiophenyl linking groups in the polymer backbone. A. K. St. Clair and W. S. Slemp (23rd. Int. SAMPE Tech. Conf., 21–24 Oct., 1991, p. 817) also described the use of phenoxy-containing monomers to provide colourless or low colour polyimides with good optical transparency for use in space applications. The polymers had Tg values in the range 175° to 275° C. Another phenoxy-containing polyimide which is described as colourless is disclosed in JP 62185715 (1987) to Mitsui-Toatsu. This is produced by reaction of oxydiphthalic anhydride (ODPA) with oxydianiline (ODA).

Nitto Electric Industrial Co. Ltd. of Japan have also developed a colourless, transparent aromatic polyimide based on biphenyl dianhydride and sulphone-containing diamines (T. Inoue, Polymer Yearbook 5, Harwood Academic Publishers, London, 1989, p. 305). Nitto Electric have also described materials based on similar colourless polyimides for use in solar cell protection (JP 63027579, 1988). The use of colourless polyimides for use in LCD applications is described in JP 63232205 (1988). Nitto have also disclosed colourless, transparent polyimide mouldings for use as coverings for semiconductor devices (JP 2003991, 1990). These materials appear to be based on polymers containing hexafluoroisopropylidene groups.

Other colourless, fluorine-containing aromatic polyimides have been described in T. Omote, T. Yamaoka and K. Koseki, J. Appl. Polym. Sci., 1989, 38, 389. These are designed for use as photoreactive precursors in microelectronics applications. Hitachi have described (D. Makino, ACS PMSE Preprints, 1992, 66, 233) the use of colourless fluorinated polyimides in optical waveguide applications. Recently, other polyimides containing the perfluoroisopropylidene group have been described by NASA as having low colour (High-Tech Materials Alert, April 1993, p. 2). These polyimides are soluble in organic solvents and form tough, flexible films and coatings.

It is clear from the above that most of the work on colourless or low colour polyimides has been undertaken on predominantly aromatic systems. Although polyimides containing aliphatic groups in the main chain have been reported, to the best of our knowledge none of these have been concerned with the colour of the polymer. B. A. Zhubanov et al (in Polyimides and other High-Temperature Polymers, Eds. M. J. M. Abadie and B. Silion, Elsevier Science Publishers, Amsterdam, 1991, p. 455) described the synthesis of polyimides from alicyclic dianhydrides. No mention was made of the colour of these polymers. They seemed to be primarily of interest for their dielectric properties. B. Ramalingam et al (Third Int. conf. on Polyimides, 2–4 Nov. 1988, Ellenville, N.Y., p. 216) described the preparation of polyimides from diamines containing non-aromatic linkages. Tg values were generally well below 300° C., the main aim being to improve processability. W. A. Feld and T-B Le (J. Polym. Sci., Polym. Chem. Ed., 1992, 30, 1099) have also described the synthesis of polyimides containing non-aromatic nitrogen linkages. These polymers were red or orange.

SUMMARY OF THE INVENTION

Our invention provides a solution to the problem of synthesis of colourless or low colour polyimides based on much cheaper, readily available starting materials. The cost-performance balance of our products is much more commercially acceptable than current alternatives. The overall market size for non-packaging transparent plastic products is expected to reach $2 billion by 1995.

The present invention thus provides a method of preparing a polyimide, which comprises reacting together a dianhydride of the general formula (II):

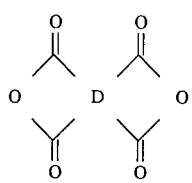

(II)

in which D is a group comprising one or more aromatic rings, to which the anhydride carbon atoms are directly bonded, with a diisocyanate of the general formula (III):

(III)

in which E is a group comprising one or more cycloaliphatic or aromatic rings, to which the isocyanate nitrogen atoms are bonded directly or via an aliphatic group, provided that the isocyanate nitrogen atoms are not bonded directly to an aromatic ring, or a blocked isocyanate, or other chemical equivalent of the diisocyanate (III).

The invention also provides a colourless or low colour polyimide having repeating units of the general formula (I):

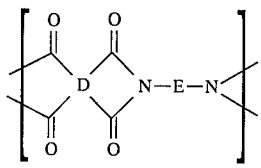

(I)

in which D is a group comprising one or more aromatic rings, to which the imide carbon atoms are directly bonded, and E is a group comprising one or more cycloaliphatic or aromatic rings, to which the imide nitrogen atoms are bonded directly or via an aliphatic group, provided that the imide nitrogen atoms are not bonded directly to an aromatic ring, obtainable by a method as defined above.

DESCRIPTION OF THE PREFERRED EMBODIMENTS

Blocked isocyanates are materials where the reactivity of the isocyanate group has been reduced by pre-reaction with an active hydrogen containing compound. Examples of the latter include phenols, oximes and imidazoles. The reaction is reversible at elevated temperatures thus releasing free isocyanate for polymerisation reaction with the dianhydride.

As component (III), diisocyanates are preferable to diamines as they give rise to less colour, and in particular possible oxidation of diamines is avoided. Another advantage of diisocyanates over diamines is that they produce soluble polyimide products, in contrast to crosslinked films which may result from the use of diamines.

The invention covers a range of colourless or low colour polyimides which are prepared by reaction of readily available aromatic dianhydrides with aliphatic or cycloaliphatic comonomers such as diisocyanates. The relative cheapness of these polymers represents a distinct advantage in many application areas. The invention thus achieves the object of synthesising low colour or (preferably) colourless high temperature polymers from readily available precursors. The products of the invention have the required high glass transition temperatures (Tg).

The polyimides of the invention generally have molecular weights in the range 1000 to 1,000,000. The polymers will also include copolymers (block, graft or random) comprising constituents of the homopolymers defined above. The polyimides consist of a segment derived from a dianhydride and a segment derived from a diisocyanate or its equivalent. The dianhydride residue contains aromatic groups. The diisocyanate (or equivalent) residue contains aliphatic or cycloaliphatic groups in the polymer main chain. The incorporation of the aliphatic or cycloaliphatic groups is important to the production of low colour polymers. The polyimides are soluble in polar organic solvents and can be cast into films. The Tg of the polymers is high, generally more than 300° C., bearing in mind the aliphatic content of the polymers.

The polyimide is generally produced with a target molecular weight in the range 1,000 to 1,000,000 and comprises a material of the structure (IV):

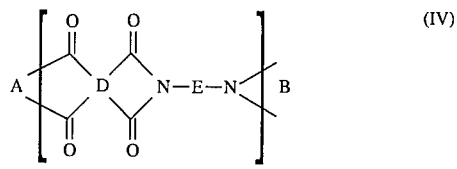

(IV)

where D is a dianhydride residue as defined above, E is a diisocyanate (or equivalent) residue as defined above, and A and B are terminal units which may or may not have the same identity. A and/or B may be reactive (e.g. amine, acid or acid anhydride) or unreactive (e.g. alkyl or aryl) terminal units.

The product may also be a copolyimide of any nature as classified and defined in IUPAC recommendations (Pure & Appl. Chem. 1985, 57, 1427–1440) and based on the description as given above.

In the above formulae, the dianhydride residue D comprises one or more aromatic rings. The aromatic rings may be single or fused rings, carbocyclic or heterocyclic, unsubstituted or substituted e.g. by $C_1$–$C_4$ alkyl or halogen, or any combination thereof. For example, D may be of the formula (V) or (VI)

(V)

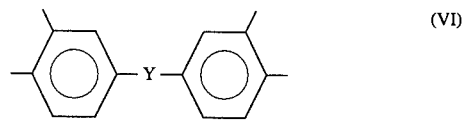

(VI)

where Y is a direct bond, —O—, —CO—, —$SO_2$—, —X—, —O—X—O—, —CO—X—CO—, —$SO_2$—X—$SO_2$— where X is an aliphatic, cycloaliphatic, aromatic or heterocyclic group. Examples of aliphatic groups X are $C_1$–$C_4$ alkylene or alkylidene, e.g. —$CH_2$— or —$C(CH_3)_2$—. An example of an aromatic group X is phenylene. X may also be any combination of aliphatic, cycloaliphatic, aromatic or heterocyclic groups, which may be linked together by linking groups including —O—, —$SO_2$—, —CO—, —3)$_2$—, —$CH_2$— or may be directly linked. Some specific examples of the group D are shown in the following Table T1.

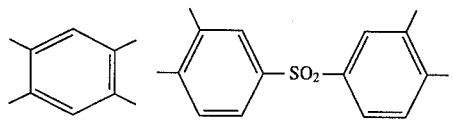

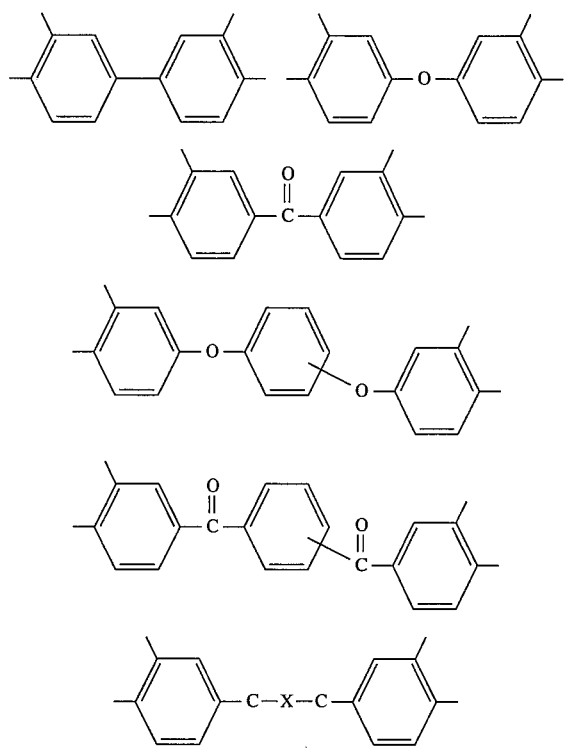

where X shall be a structure comprised of aryl, alkyl, cycloaliphatic or heterocyclic constituents, or combinations thereof, which shall be linked together, where appropriate, by linking units including —O—, —SO—CO—, —C(CH$_3$)$_2$—, —CH$_2$— or shall directly linked.

The group E is a diisocyante (or equivalent) residue and comprises one or more cycloaliphatic or aromatic rings. The group E is preferably of the general formula (VII):

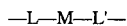  (VII)

where M is an aliphatic or aromatic, carbocyclic or heterocyclic ring, optionally substituted by C$_1$–C$_4$ halogen, or more than one such ring fused or joined by a linking group, and L and L' each independently represent a direct bond or a C$_1$–C$_5$ alkylene or alkylidene group, provided that and L' do not represent a direct bond if M represents a non-aliphatic group.

Some more preferred general formulae for E are as follows:

  (VIII)

  (IX)

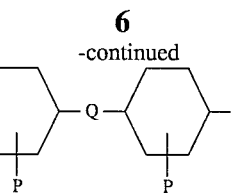  (X)

where P represents hydrogen (unsubstituted ring) or one or more C$_1$–C$_4$ alkyl or halogen substituents, L and L' are as defined above, and Q is the same as L or L' or corresponds to formula (VIII).

Some particularly preferred examples of the group E are shown in Table T2.

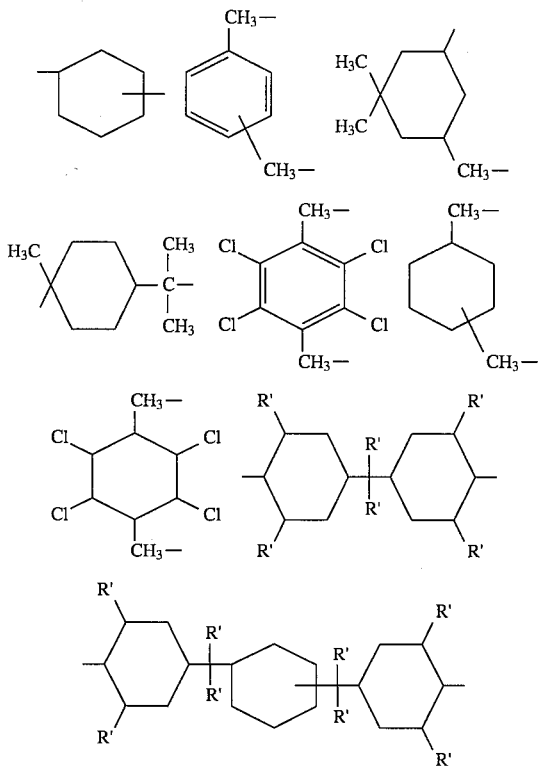

where R'=H or CH$_3$ or C$_2$H$_5$.

The reaction to produce the polyimides or copolyimides according to the invention can be carried out under normal polyimide-forming conditions. Solvents, catalysts and the like which are conventional in polyimide chemistry can be used as required. Monofunctional reagents can be used to provide unreactive terminal units. Alternatively, the ratio of dianhydride to diisocyanate (or equivalent) can be non-stoichiometric, which will lead to polymer chains with reactive terminal units.

The main advantages of the invention are:
(1) The colourless and low colour polyimides can be prepared easily from readily available precursors.
(2) A wide range of homo- and copolymers can be synthesised depending on the final properties required.
(3) The polymers are soluble in a range of polar organic solvents.
(4) The polymers can be formed into thin films or coatings with high refractive index.
(5) The polymers exhibit higher than expected Tg values, generally in excess of 300° C.
(6) The polymers exhibit good thermal stability in air at 200° C.
(7) The polymers show good transmission characteristics across the visible spectrum.

(8) The polymers have low dielectric constants (<3.0) over a wide temperature range, making them suitable for optoelectronic applications (wave guides, fibre optics etc).

(9) Because they have little or no inherent colour, the polymers can be pigmented to provide products exhibiting true and invariant colours.

(10) The apparent lack of charge transfer complexation in these polymers (resulting in lack of colour) means that the polymers are useful as processing aids for other miscible high viscosity polymers in general and polyimides in particular.

(11) The polymers can also be used as matrices in polymer composites, where control of the colour of the composite is required, or where the other desirable features of the polymer (e.g. low dielectric constant) are required.

(12) Other (non-limiting) applications for the polymers include high temperature colourless or pigmented coatings for metals (iron, steel, copper, aluminium etc), plastics (thermosets and thermoplastics) and ceramics. They can be used in electronic packaging, as matrices for printed circuit board laminates and in electrical insulation. They can also be used as inspection windows in, for example, chemical plant and in vehicle engine reservoirs. They can be used as transparent windows for liquid crystal displays, light emitting diodes, solar panels and so on. Other uses include transparent products for use in medical and related applications where the products are required to be sterilised between use by autoclaving.

The invention is illustrated by the following Examples.

EXAMPLE 1

13.61 g (0.046 mol) of biphenyltetracarboxylic dianhydride (BPDA), 0.5 ml of distilled, deionised water and 80 g of benzonitrile were heated together under a nitrogen atmosphere for 60 mins. The solution was then cooled and 10.51 g (0.047 mol) isophorone diisocyanate (IPDI), 2.0 g triethylenediamine (TED) and 25 g of benzonitrile added. The solution was stirred under a nitrogen atmosphere and heated at 140° C. for 6 hrs whilst carbon dioxide was evolved. At the end of 6 hrs, when carbon dioxide evolution had ceased, the reaction mixture was cooled to room temperature and diluted with a further 50 g of benzonitrile. This liquid was then precipitated into 1200 ml acetone and the precipitate filtered. The solid was stirred in 1000 ml of acetone with a high shear mixer and 150 ml of water added. Stirring was continued for 20 mins. The mixture was filtered, washed with copious quantities of acetone and dried in stages at different temperatures up to 180° C. Yield 18.28 g (91%) white powder, Tg 370° C.

A film of this material of 0.06 mm nominal thickness had a u.v. cut-off at 369 nm, $N_D$ of 1.61 and showed >85% transmission across the entire visible spectrum. In dielectric thermal analysis, this film possessed dielectric constant <3.0 and dissipation factor <0.025 over the temperature range 30°–300° C. at the test frequency of 1 kHz. Ageing of this film in a forced air oven at 200° C. for 100 hours resulted in essentially no discolouration of the film.

EXAMPLE 2

12.27 g (0.056 mol) of pyromellitic dianhydride (PMDA) and 12.73 g (0.057 mol) of IPDI were used as the raw materials in the procedure as described in example 1. Yield 18.96 g (93%) cream coloured powder, Tg 367° C.

EXAMPLE 3

14.00 g (0.043 mol) of benzophenone tetracarboxylic dianhydride (BTDA) and 9.88 g (0.044 mol) of IPDI were the monomers used. The procedure was as described in example 1. Yield 16.79 g (84%) pale yellow powder, Tg 349° C.

EXAMPLE 4

14.92 g (0.035 mol) of isophthaloyl diphthalic anhydride (IDPA) and 8.00 g (0.036 mol) of IPDI were reacted together as described in example 1. Yield 16.35 g (83%) pale yellow powder, Tg 307° C.

EXAMPLE 5

14.42 g (0.040 mol) of diphenylsulphonedianhydride (DSDA) and 9.17 g (0.041 mol) of IPDI were the raw materials used in the procedure of example 1. Yield 14.59 g (73%) off-white powder, Tg 371° C.

EXAMPLE 6

14.42 g (0.040 mol) of DSDA, 0.30 g (0.002 mol) of phthalic anhydride (PA) and 9.17 (0.041 mol) of IPDI were the monomers used. The procedure described in example 1 was slightly amended in that the PA was added to the reaction flask at the same time as the DSDA. The remainder of the experimental procedure was unaltered. Yield 17.56 g (88%) off-white powder, Tg 369° C.

We claim:

1. A method of preparing a polyimide comprising: reacting together a dianhydride of the formula (II)

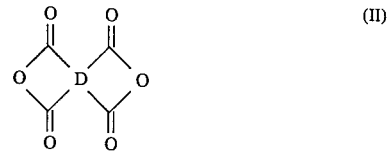

in which D is a group comprising one or more aromatic rings, to which the anhydride carbon atoms are directly bonded, with a diisocyanate of the formula (III)

in which E is a group comprising one or more cycloaliphatic or aromatic rings, to which isocyanate nitrogen atoms are bonded directly or via an aliphatic group, provided that said isocyanate nitrogen atoms are not bonded directly to an aromatic ring, or a blocked isocyanate, or other chemical equivalent of said diisocyanate (III), to form a polyimide having repeating units of the formula (I)

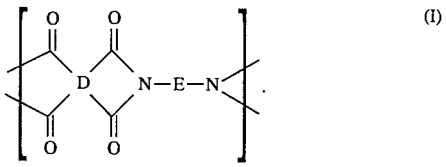

2. A polyimide having repeating units of the formula (I)

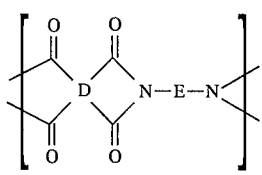 (I)

in which D is a group comprising one or more aromatic rings, to which the anhydride carbon atoms are directly bonded, and E is a group comprising one or more cycloaliphatic or aromatic rings, to which isocyanate nitrogen atoms are bonded directly or via an aliphatic group, provided that said isocyanate nitrogen atoms are not bonded directly to an aromatic ring, prepared by reacting together a dianhydride of the formula (II)

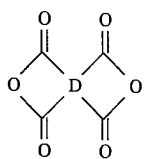 (II)

wherein D has the same meaning as in formula (I) with a diisocyanate of the formula (III)

OCN—E—NCO (III)

wherein E has the same meaning as in formula (I) or a blocked isocyanate, or other chemical equivalent of said diisocyanate (III).

3. A method according to claim 1, in which D is of the formula (V) or (VI):

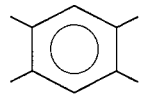 (V)

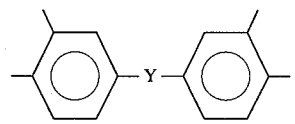 (VI)

where Y is a direct bond, —O—, —CO—, —SO$_2$—, —X—, —O—X—O—, —CO—X—CO—, —SO$_2$—X—SO$_2$— where X is an aliphatic, cycloaliphatic, aromatic or heterocyclic group.

4. A method according to claim 1 or 3, in which E is of the formula (VII):

—L—M—L'— (VII)

where M is an aliphatic or aromatic, carbocyclic or heterocyclic ring, optionally substituted by $C_1$–$C_4$ alkyl or halogen, or more than one such ring fused or joined by a linking group, and L and L' each independently represent a direct bond or a $C_1$–$C_5$ alkylene or alkylidene group, provided that L and L' do not represent a direct bond if M represents a non-aliphatic group.

* * * * *

UNITED STATES PATENT AND TRADEMARK OFFICE
CERTIFICATE OF CORRECTION

PATENT NO.   : 5,614,607
DATED        : March 25, 1997
INVENTOR(S)  : John N. HAY, et al.

It is certified that error appears in the above-indentified patent and that said Letters Patent is hereby corrected as shown below:

On the title page, item [54] and column 1, lines 1-4, the title should read:

--[54]   POLYIMIDE AND A METHOD OF PREPARING POLYIMIDE FROM TETRACARBOXYLIC DIANHYDRIDE AND DIISOCYANATE--

In Item [75], the second inventor's residence should read:

--Edenbridge--

Signed and Sealed this

Eighth Day of July, 1997

Attest:

BRUCE LEHMAN

Attesting Officer

Commissioner of Patents and Trademarks